United States Patent
Hunter et al.

[11] Patent Number: 6,116,680
[45] Date of Patent: Sep. 12, 2000

[54] STRUCTURAL COMPONENT FOR VEHICLE BODY-IN-WHITE

[75] Inventors: Daniel E. Hunter, Export; Rodney Heiple, Apollo; Jeffrey M. Shoup, Delmont, all of Pa.; Dirk Schnapp, Soest; Klaus Ruehle, Aichwald, both of Germany

[73] Assignee: Aluminum Company of America, Pittsburgh, Pa.

[21] Appl. No.: 08/941,939

[22] Filed: Oct. 1, 1997

[51] Int. Cl.⁷ .................................................... B62D 23/00
[52] U.S. Cl. ................ 296/203.03; 296/203.01; 296/187; 296/205
[58] Field of Search .............................. 296/205, 203.01, 296/203.03, 202, FOR 205, FOR 202, 187; 403/361, 382, 363

[56] References Cited

U.S. PATENT DOCUMENTS

| | | | |
|---|---|---|---|
| 4,082,578 | 4/1978 | Evancho et al. | 148/12.7 |
| 4,618,163 | 10/1986 | Hasier et al. | 280/785 |
| 4,988,230 | 1/1991 | Banthia et al. | 403/170 |
| 5,048,887 | 9/1991 | Kunishima et al. | 296/146 |
| 5,059,056 | 10/1991 | Banthia et al. | 403/170 |
| 5,096,254 | 3/1992 | Sparke | 296/193 |
| 5,271,687 | 12/1993 | Holka et al. | 403/233 |
| 5,720,511 | 2/1998 | Benedyk | 296/203 |
| 5,800,003 | 9/1998 | Clenet | 296/29 |
| 5,829,219 | 11/1998 | Sugawara et al. | 52/653.2 |

*Primary Examiner*—Dennis H. Pedder
*Assistant Examiner*—Mickki D. Murray
*Attorney, Agent, or Firm*—Thomas R. Trempus

[57] ABSTRACT

An integral structural element particularly well suited as a component of a body-in-white comprises an elongated hollow member with a first end and a second end opposite thereto. A first region, a second region, and a third region extend between a first end and a second end of the hollow member. A first flange extends substantially the length of the elongated hollow member. A second flange extends substantially the length of the elongated hollow member's first region. A first socket or connecting structure is adapted to receive therein a roof header and is disposed on the elongated hollow member between the first region and the second region. A second socket is adapted to receive therein a B-post disposed on the elongated hollow member between the second region and the third region. This integral structural element is a component of a motor vehicle's body-in-white.

17 Claims, 9 Drawing Sheets

STRUCTURAL COMPONENT FOR VEHICLE BODY-IN-WHITE

BACKGROUND OF THE INVENTION

The invention relates to a structural component that is an element in a body-in-white. More particularly, the invention is a unique structural component that functions as the A-post and side roof rail with attachment points for the roof header and the B-post. Additionally, the invention provides several socket or joint configurations that function as the aforesaid attachment points.

DESCRIPTION OF THE PRIOR ART

A space frame structure is a technologically advanced body-in-white. More specifically, the space frame is an automotive chassis made from a combination of extruded lineal members held together by connecting members that are formed from extrusions, cast shapes, stamped sheet parts, or combinations thereof. FIG. 1 shows an exploded view in perspective of structural parts forming the left side of an automotive chassis in a prior art space frame body-in-white. The Audi A8 is a commercially available motorcar that incorporates many of the space frame features represented by the chassis in FIG. 1. The left side of the vehicle generally indicated by the reference character 1 includes a roof support brace 3 (or roof rail) comprising a straight section cut from extruded stock. This and other members subsequently described in connection with this figure may advantageously be tubular in configuration adapted to lend both strength and lightweighting to the chassis. Made by a method similar to that of brace 3 but being of a different cross-section, is a forward roof post 5. The post 5, typically identified as the "A-post", is provided with a flange 7 to which a window may be attached. The post 5 is also part of a front door frame. The ends of the roof support brace 3 and of the post 5 facing each other are retained in a forward connecting member or joint 9. Joint 9 comprises two internesting and complimentary substantially cup-shaped members one of which faces the inside of the chassis, the other facing outwardly. The members may be moved apart to provide openings into which the ends of the lateral roof support brace 3 of the post 5 and of a transverse roof brace (or roof header) 161 may be inserted. Once these three members have been inserted into the joint 9, the two members thereof are moved toward each other and clamped or tightened together. Alternatively, the joint 9 may be a cast member or an extruded node. The end of the roof post 5 facing away from the joint 9 is received in a further joint 11. This joint 11 is adapted to join together four different components, i.e., in addition to the roof post 5 other elongated members are anchored in it. These are shown to be a forward door post 13, a fender support brace 15, and a transverse girder (not shown). The forward door post 13 and the fender support brace 15 are made by extrusion process. They are anchored in joint 11 in a manner so as to extend at a substantially right angle relative to each other. As shown in the drawing, they are mounted upon extensions 19 and 21 respectively with joint 11, the outer contour of the extensions corresponding to, or complimenting, the inner contour of recesses or cutouts in the element 13.

The lower end of the forward door post 13 is anchored in a joint 27. The threshold member 31 extends rearwardly from the joint 27. The rearend of the threshold member 31 extends into a rear connecting member or joint 45 which also serves as a support 47 for the automotive suspension system. In addition to the threshold 31, joint 45 supports a door support 49 that is often identified as a "C-post". A center post 43 or B-post, extends between the roof support 3 and the threshold member 31. Additional details about the components and the assembly of an automotive chassis as briefly described herein and above are available in U.S. Pat. No. 4,618,163 entitled, "Automotive Chassis", the contents of which are incorporated by reference as if fully set forth herein.

As is clearly shown in FIG. 1 of the prior art, it is the conventional process in a spaceframe structure to manufacture an A-post 5, a roof rail 37 and an interconnecting node or joint 9. These three components are made in different processes. The A-post 5 is formed from a first hollow extruded shape or stamped part. The roof rail 3 is produced from a second hollow extrusion. Finally, the interconnecting member or node 9 is made either from a cast member or from stamped sheet parts assembled to form a node. It has been suggested that a node can be manufactured through an extrusion process. U.S. Pat. No. 4,988,230 which is assigned to the assignee of the instant invention teaches just such an extruded node. The contents of this patent are incorporated by reference as if fully set forth herein. The A-post, roof rail, node assembly is usually accomplished by welding the multiple components together. The tolerance requirements in the manufacture of the individual components of this assembly can often result in high scrap rates and difficulties in the assembly process. Due to the complexity of the various parts and the tight dimensional requirements for welding, there is a need for improvements to both the structural elements and the assembly techniques.

It is therefore an object of the present invention to provide a one-piece extruded structural element that functions as an A-post and roof rail that also provides mounting sockets for the roof header and a B-post.

It is also an object of this invention to provide an improved automotive structural element that facilitates part consolidation and the assembly of the vehicle.

It is yet another object of this invention to reduce the costs of the structural elements used in the assembly of a spaceframe type structure by providing an extruded member that is further formed to display one or more of the characteristic features of this invention.

SUMMARY OF THE INVENTION

The invention provides an integral structural element particularly well suited as a component of a body-in-white. The structural element comprises an elongated hollow member with a first end and a second end opposite thereto. The elongated hollow member defines a first region, a second region, and a third region extending between a first end and a second end. A first flange means extends substantially the length of the elongated hollow member. A second flange means extends substantially the length of the elongated hollow member's first region. A means defining a first socket or connecting structure is adapted to receive therein a roof header. The first socket means is disposed on the elongated hollow member between the first region and the second region. A means defining a second socket is adapted to receive therein a B-post and is disposed on the elongated hollow member between the second region and the third region. This integral structural element is a component of a motor vehicle's body-in-white. Preferably, the integral structural element is produced from an extruded member having an integral flange. The second flange and the first and second socket means are formed into the extrusion by, for example, hydroforming.

BRIEF DESCRIPTION OF THE DRAWINGS

The above as well as other features and advantages of this invention can be appreciated through a consideration of the detailed description of the invention in conjunction with the several drawings in which.

DETAILED DESCRIPTION OF THE INVENTION

Figure 2:
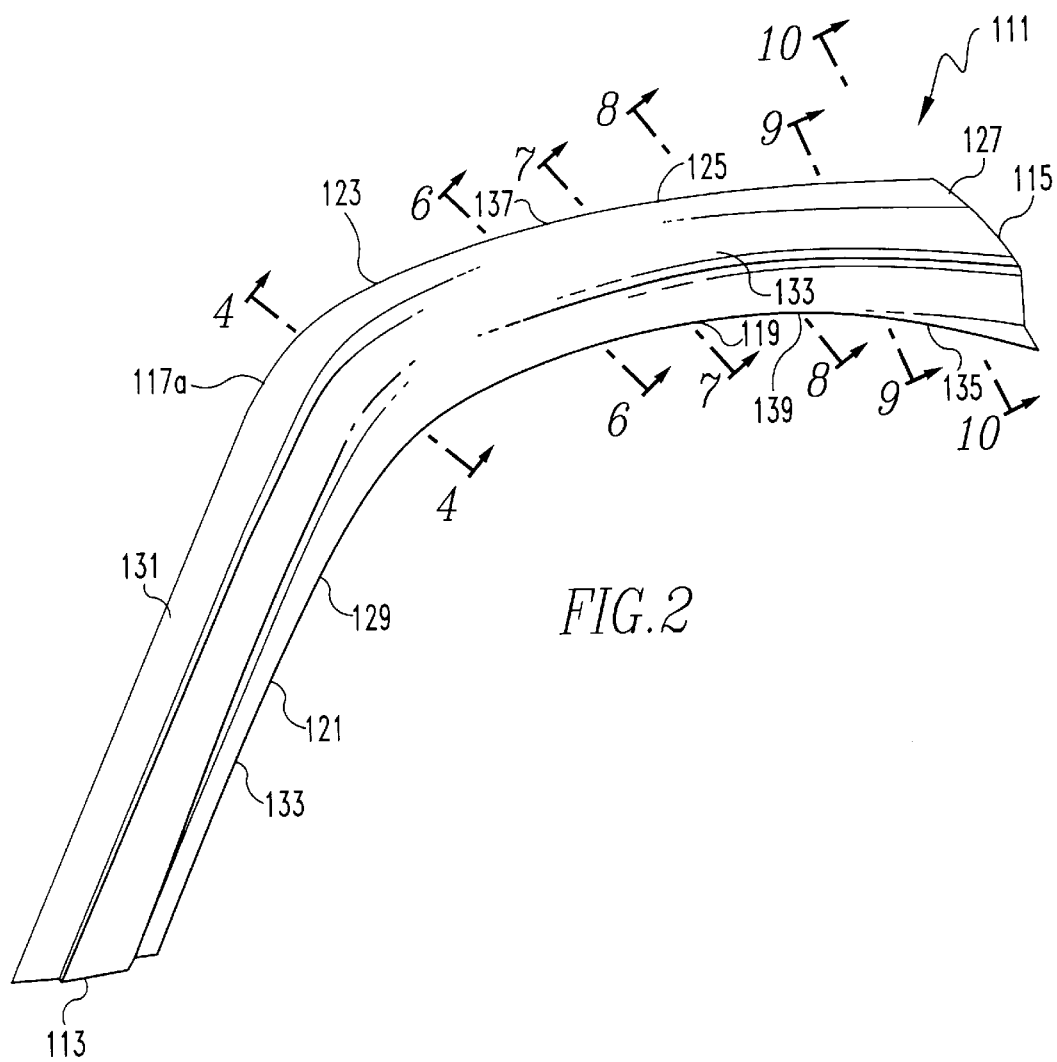
FIG. 2 is a side elevation of an A-post-roof rail structural element of this invention.

Turning now to FIG. 2, a side elevation of the A-post roof rail structural component or element of this invention is generally indicated by the reference character 111. This structural element 111 entails a number of unique features. The finished part cross-section varies along the length of the part beginning with a compact, single-hollow section with two external flanges in the A-post area and transitioning to an elongated, single-hollow section with one external flange in the side roof rail area. The transition from two flanges to one flange is accomplished by forming one of the flanges in the A-post by folding a closed portion of the hollow extrusion, thus producing a double thickness, flat flange. The connection areas where the roof header is joined to the structural element and the B-post is joined to the structural element may be formed by locally bulging the extrusion wall to form a male socket over which the associated hollow extrusion is fastened. Fastening can be accomplished through adhesive attachment, by welding, or with mechanical fasteners. At the end of the part at which the C-post may be attached, it is a general design consideration that the single hollow form be expanded and adapted to receive the C-post.

Figure 3:
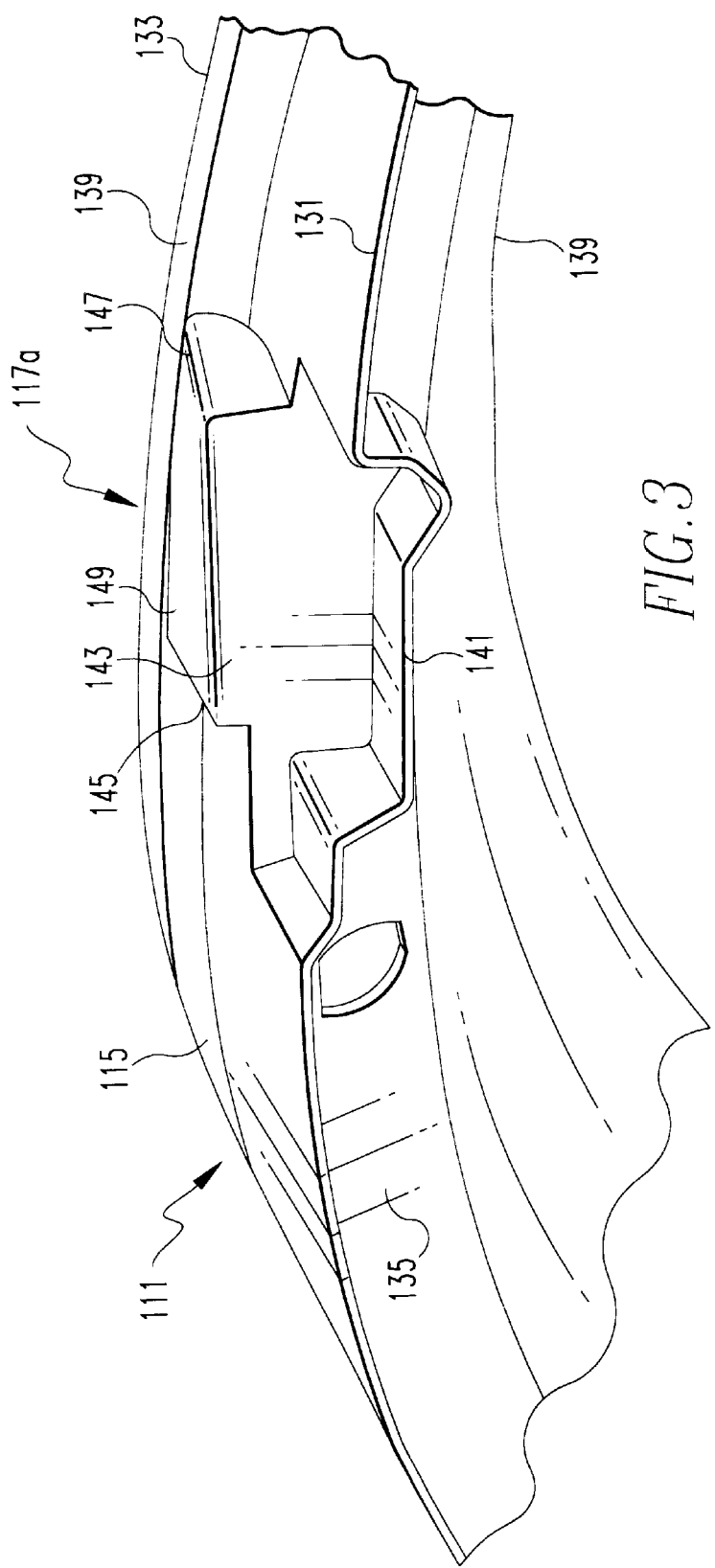
FIG. 3 is a side elevation view of the first joint region wherein the roof header is attached to the A-post roof rail structural element of this invention.
Figure 11:
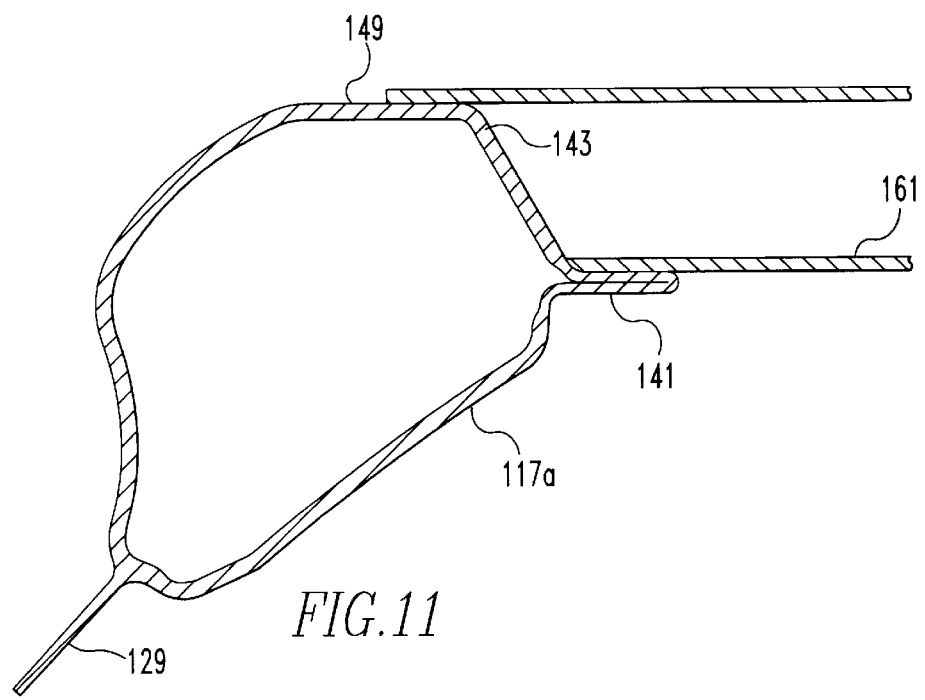
FIGS. 11 through 15 are several alternative configurations that facilitate the mounting of a roof header to the first joint.

The structural element 111 has a first end 113 and a second end 115 opposite thereto. Disposed between the first and second ends 113 and 115 are a first joint region 117a (alternative embodiments of the joint region identified by reference character 117a in FIGS. 3 and 11 are identified by reference the series of reference characters 117b, 117c, 117d, 117e and illustrated in FIGS. 12 through 15 respectively.) and a depression or second joint region 119. The features of the structural element 111 can be perhaps better appreciated in this description by considering the structural element 111 is formed to consist of three sections: The first section 121 extends from the first end 113 to the first joint region 117a. The second region 123 extends from approximately the first joint 117a to the second joint 119. Finally, a third region 125 extends between the second joint 119 and the second end 115 of the hollow extruded member 127. It is to be understood that the initial hollow from which the structural member of this invention is formed is extruded in a constant cross-section. Subsequent bending and shaping operations result in the structure of this invention.

The structural component or member 111 formed from the hollow extruded member 127 includes an integral flange 129 extending from the first end 113 and terminating at the second end 115. The flange 129 serves as an element to a vehicle door frame such as a mounting point for gasket material or a sealing means that is engaged by a front door of a vehicle. A second flange 131 extends from the first end 113 of the structural element 111 and terminates proximate the first joint 117a. The second flange 131 provides a seating member on which a wind screen (now shown) may rest.

Figure 4:
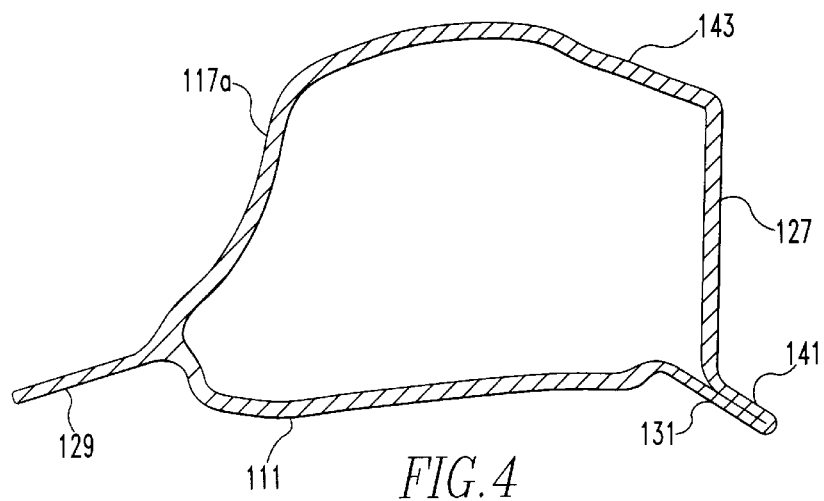
FIG. 4 is a section through the roof header joint along lines 4—4 of FIG. 2.

A detail of the first joint 117a is shown in side elevation in FIG. 3. The view of FIG. 3 is opposite the view seen in FIG. 2. In other words, generally speaking, the portion of the structural member 111 is seen in FIG. 3 as it would be viewed from inside the vehicle greenhouse. Thus, the A-post roof rail 111 includes an outside face 133, an inside face 135, an upper face 137, and a lower face 139. The first joint 117a is adapted to receive therein the upper roof header (element 161 in FIG. 1). The upper roof header is of a profile designed to accommodate the design characteristics of the vehicle in which the A-post roof rail structural element 111 is mounted. Accordingly, the details of the configuration of the first joint are shown as an exemplar. As discussed hereinafter, alternative joint configurations are possible. In FIG. 3, the first joint 117a includes a stepped flange portion 141 that is generally a continuation of the second flange 131. A shoulder portion 143 includes elevated side portions 145 and 147 and an upper planar region 149. The combination of the stepped flange 141 and the shoulder portion 143 define connecting surfaces to which the roof header may be attached. As can be seen in FIG. 4, the stepped flange 141 and the shoulder portion 143 define substantially the parallel surfaces onto which the roof header may be mounted.

Figure 5:
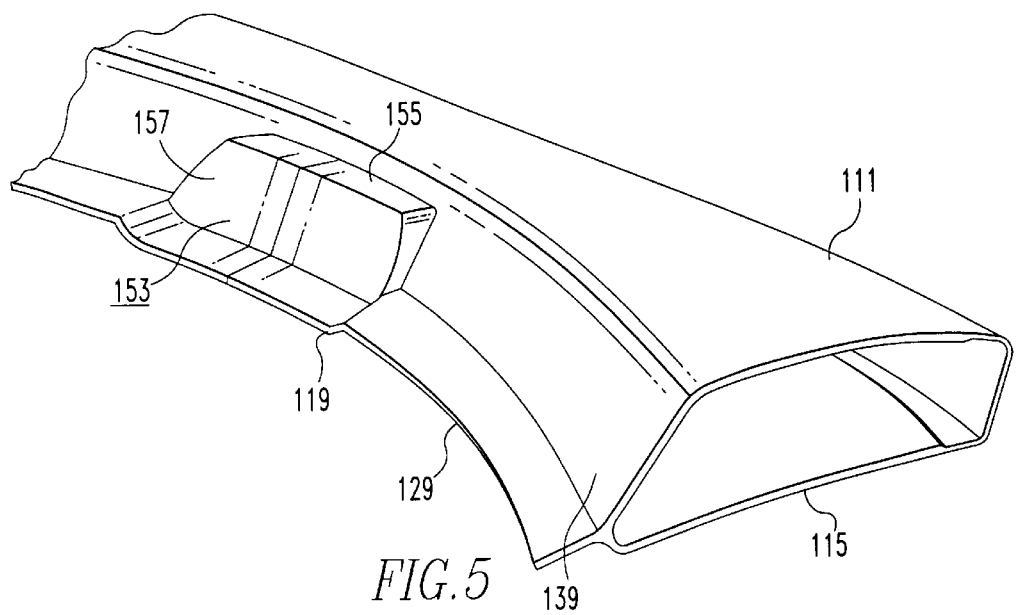
FIG. 5 is a view of the second joint region wherein the B-post of a vehicle chassis is attached to the structural element of this invention.
Figure 6:
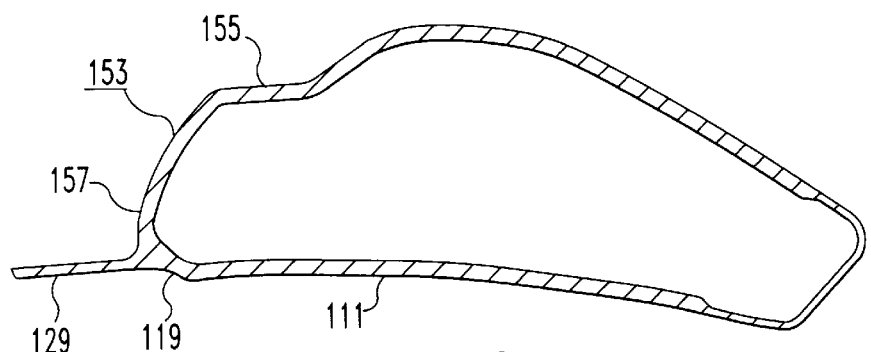
FIG. 6 is a section through lines 6—6 of FIG. 2.
Figure 7:
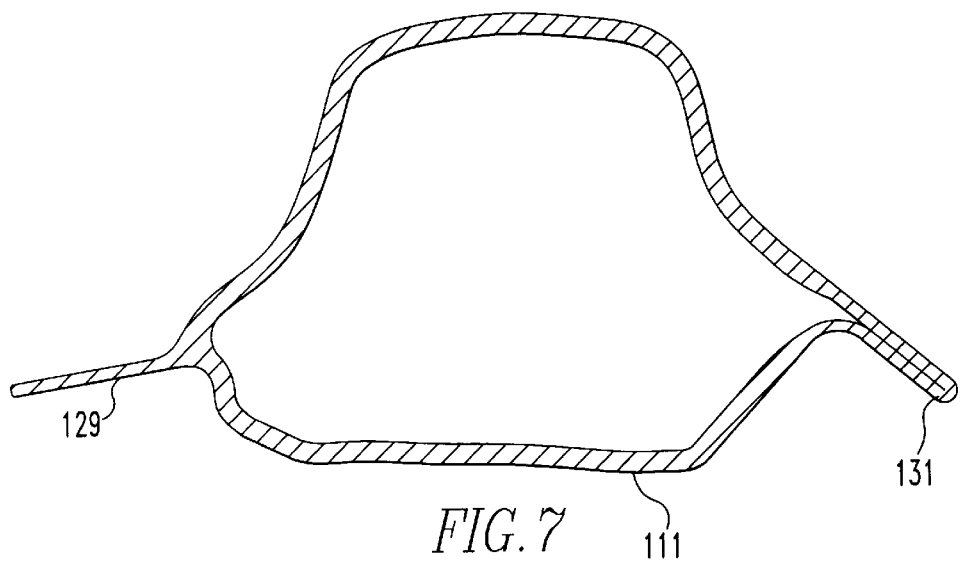
FIGS. 7 through 10 are sections through the A-post roof rail structural element of FIG. 2 along the lines 7—7, 8—8, 9—9, and 10—10 as indicated thereon.
Figure 8:
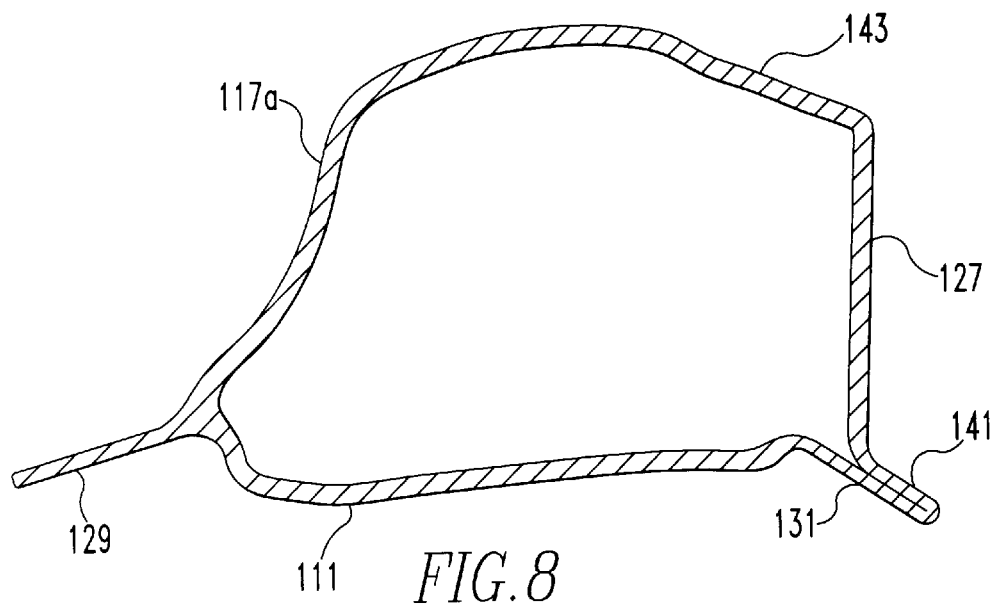
Figure 9:
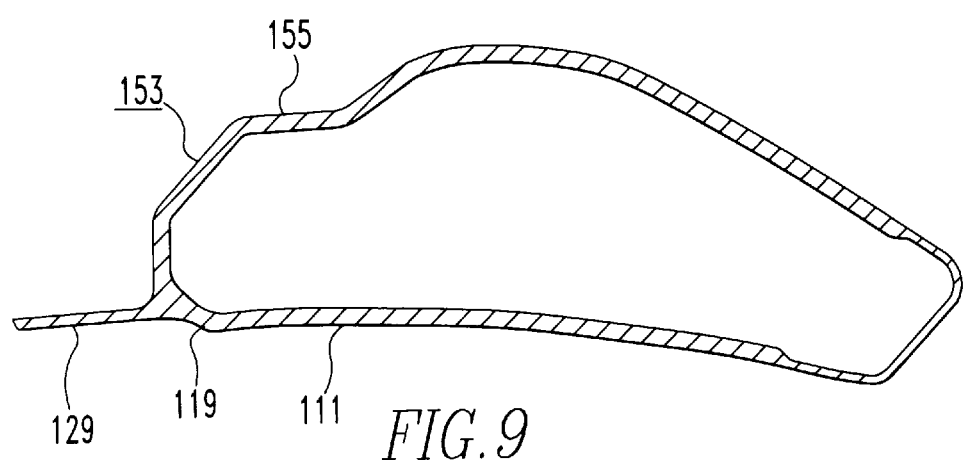
Figure 10:
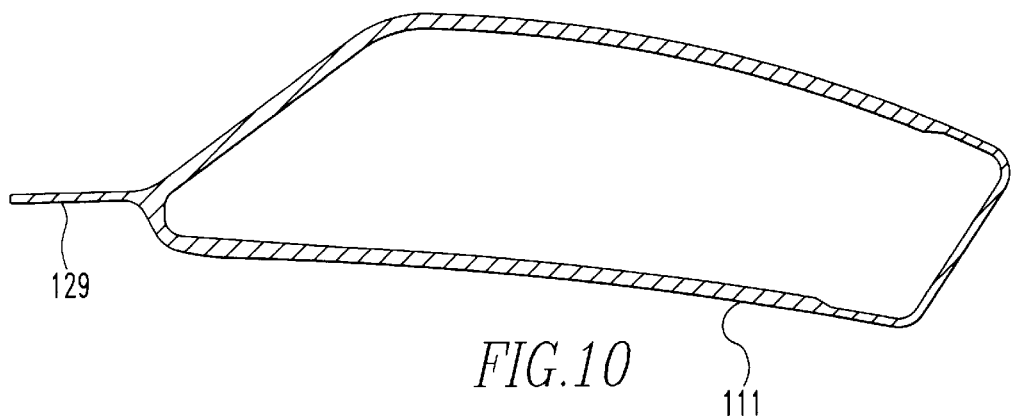

Turning to FIG. 5, the lower face 139 of the structural element 111 includes a second joint 119. The first flange 129 forms a portion of the joint 119. Additionally, the joint 119 includes an elevated mounting member 153. The mounting member 153 includes a shoulder portion 155 extending about the elevated mounting member 153 so as to form in combination with the flange 129 the mounting member 153. The shoulder portion 155 opposite the flange 129 defines in combination with the flange 129 parallel mounting surfaces onto which the B-post (element 43 of FIG. 1) can be attached. These parallel surfaces can be appreciated through the cross-sectional view of the joint 119 shown in FIG. 6.

The portion of the first flange 129 extending aft of the second joint 119 and terminating at the second end 115 of the structural member 111 may function as a vehicle door frame element such as the upper sealing surface for a rear door of a four-door vehicle. It should be appreciated, however, that when the structural element 111 is used in a 2-door vehicle configuration, the flange portion 129 aft the second joint 119 may function as a frame member or the sealing surface of the rear quarter window.

FIGS. 7 through 10 show sections through the structural member 111 at the locations indicated in FIG. 2. The relationship of the first and second flanges relative to the first and second sockets or joints can be appreciated in the several sectional views.

Figure 1:
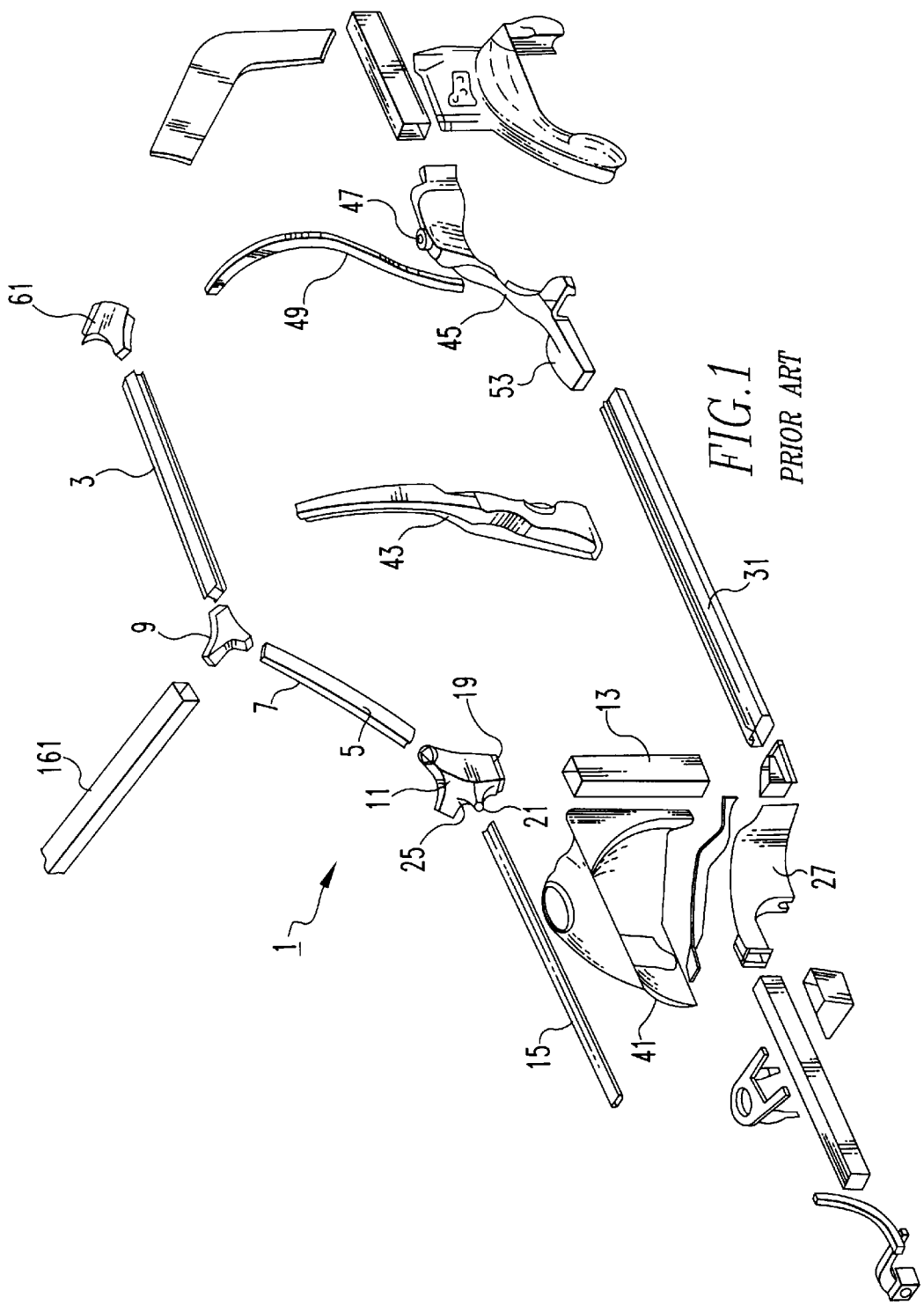
FIG. 1 is a prior art illustration of an exploded view in perspective of structural parts forming the left side of an automobile chassis.
Figure 12:
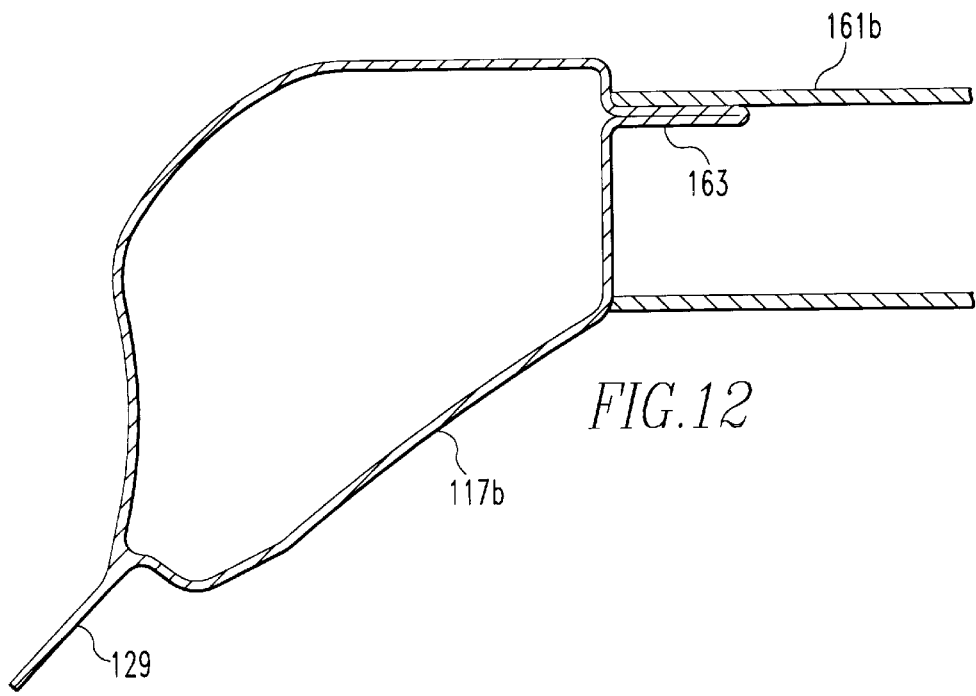
Figure 13:
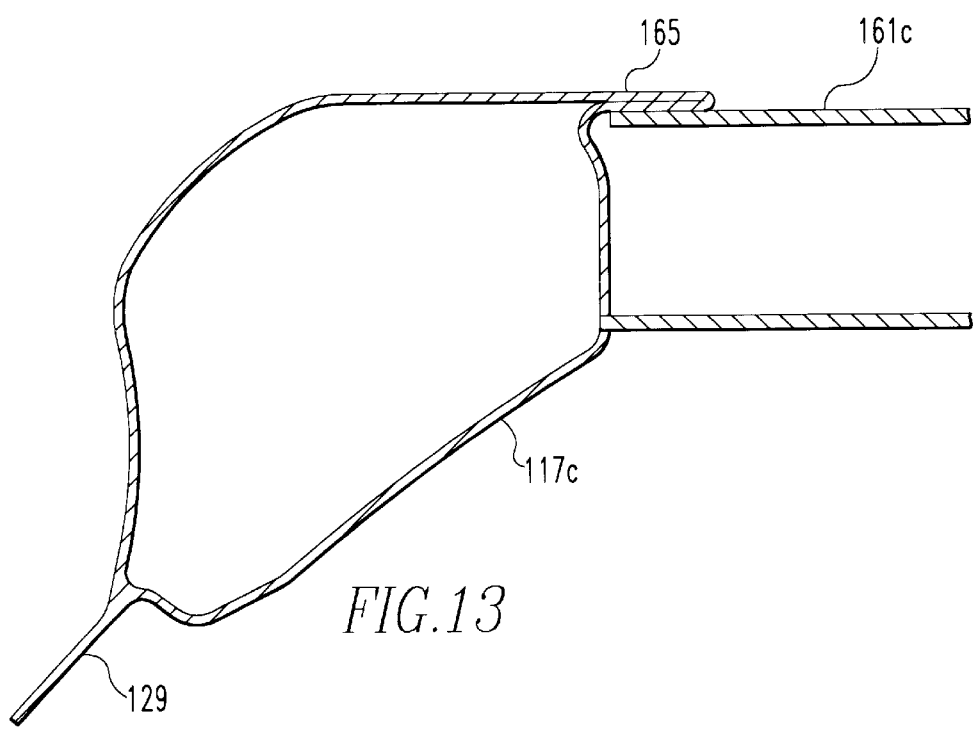
Figure 14:
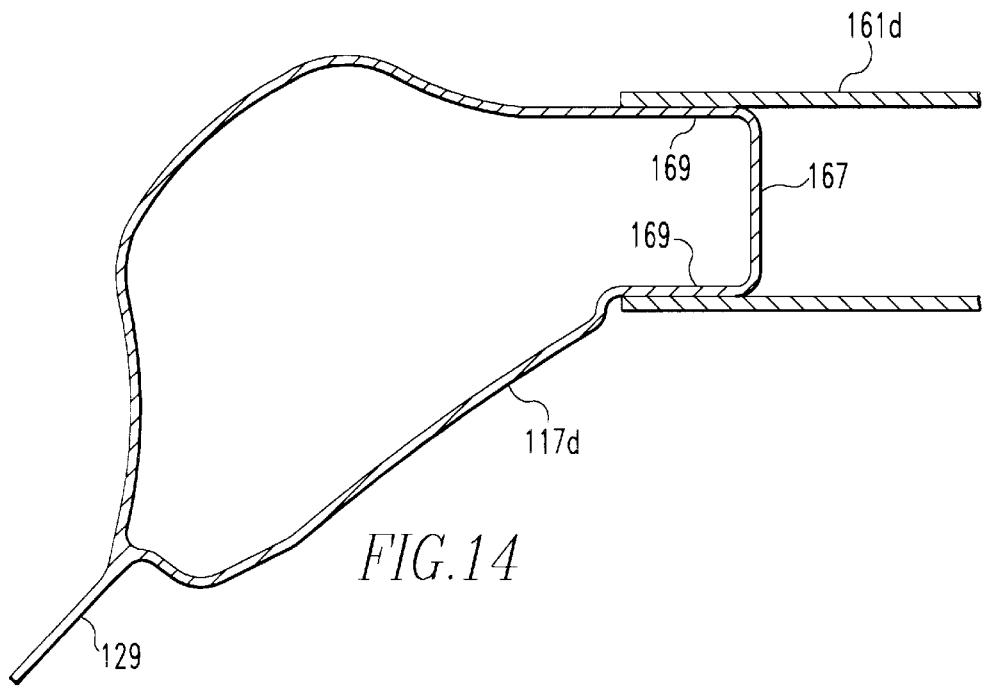
Figure 15:
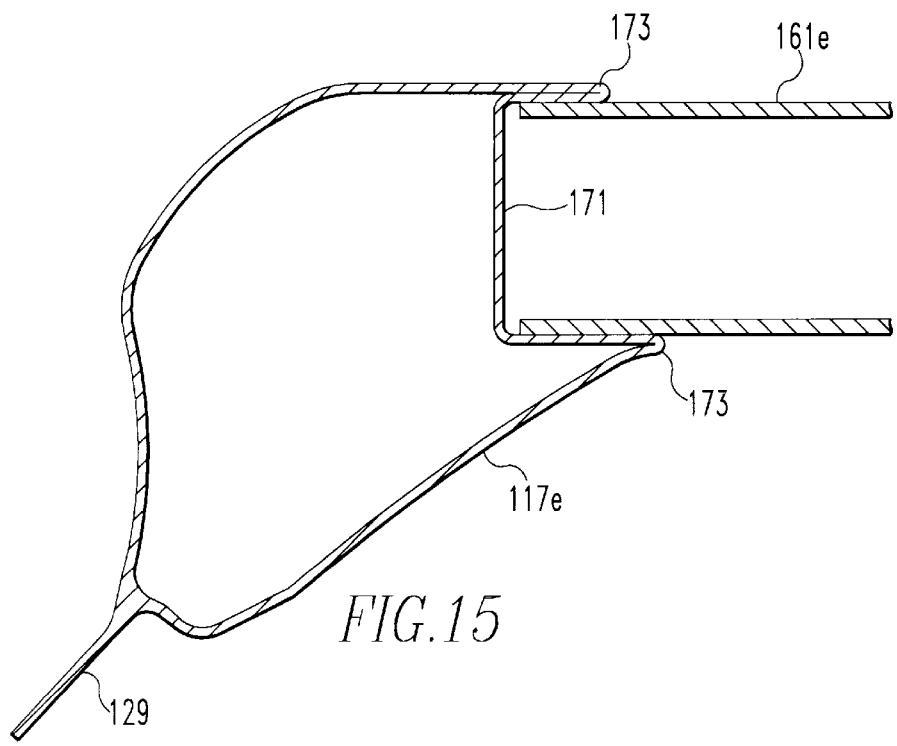

FIGS. 11 through 15 illustrate five configurations for attaching the roof header to the A-post roof rail element of this invention. FIG. 11 shows a roof header 161a attached to the first joint 117a. (Alternative embodiments of the roof header 161 as shown in the prior art structure of FIG. 1 are identified by the series of reference character 161a, 161b, 161c, 161d, and 161e and illustrated in FIGS. 11 through 15 respectively.) The stepped flange 141 is in contact with the outer surface of the roof header and the upper planar region 149 of the shoulder portion 143 is in contact with the inner portion of the roof header. FIGS. 12 through 15 illustrate alternative joint configurations that can be incorporated into the A-post roof rail structural member of this invention. In FIG. 12, the roof header 161b is supported by a single flange 163 at a first joint 117b. Here the flange supports the inner surface of what would typically be a hollow extruded member. FIG. 13 shows an alternative embodiment in which a single flange 165 extends from the first joint region 117c and is connected to the outer surface of the roof header 161c. In FIG. 14 an alternative joint configuration for the first joint 117d shows an enlarged shoulder portion 167 with parallel sides 169 onto which the roof header 161d is mounted for internal fastening. Here the roof header 161d slidingly engages the shoulder portion 167. In another alternative embodiment of FIG. 15, the first joint 117e defines a socket-like configuration 171 with parallel sides 173 into which the roof header 161e is received.

What has been described is an integral, structural element that defines the A-post, connecting node, and side roof rail of an automotive vehicle body in white.

What is claimed is:

1. An integral A-post roof rail structural element for use in a body-in-white comprising: an elongated hollow member with a first end and a second end opposite thereto, a first flange means extending substantially the length of said elongated hollow member and shaped to function at least in part as a portion of a vehicle door frame, a second flange means defining a portion of a windscreen seating flange, a depression in one of the flange means defining a first socket disposed on, and integral to, said elongated hollow member and shaped to receive a roof header, and a second depression in the other of said flange means defining a second socket disposed on, and integral to, said elongated hollow member and shaped to receive a B-post, wherein said first and said second sockets are distinct from said first and said second ends.

2. The integral A-post roof rail structural element according to claim 1 wherein said elongated hollow member is produced by a metal extrusion process.

3. The integral A-post roof rail structural element according to claim 1 wherein said elongated hollow member is produced by a metal extrusion process that forms the first flange means.

4. The integral A-post roof rail structural element according to claim 1 wherein said elongated hollow member is produced by a metal extrusion process and the second flange means is formed by the folding of elongated hollow member.

5. The integral A-post roof rail structural element according to claim 1 wherein the first socket is disposed on said elongated hollow member substantially opposite the first flange means.

6. The integral A-post roof rail structural element according to claim 1 wherein the second socket is disposed between the first socket and the second end of the hollow elongated member.

7. The integral A-post roof rail structural element according to claim 1 wherein the second flange means is disposed on the hollow elongated member substantially opposite the first flange means.

8. The integral A-post roof rail structural element according to claim 1 wherein the second flange means extends from the first end of the hollow elongated member to the first socket.

9. The integral A-post roof rail structural element according to claim 1 wherein the first socket is disposed between the second socket and the first end of the hollow elongated member.

10. The integral A-post roof rail structural element according to claim 1 wherein first socket includes a shoulder portion that defines a mounting surface shaped to cooperate with one end of a roof header member.

11. The integral A-post roof rail structural element according to claim 10 wherein the flange portion and the shoulder portion of the first pocket define parallel mounting surfaces shaped to cooperate with one end of a roof header member.

12. The integral A-post roof rail structural element according to claim 1 wherein the second socket comprises the first flange means and a shoulder portion that define in combination parallel mounting surfaces shaped to cooperate with an upper end of a structural component.

13. The integral A-post roof rail structural element according to claim 12 wherein the upper end of a structural component is the upper end of a B-post.

14. An integral structural element for use in a body-in-white comprising: an elongated hollow member with a first end and a second end opposite thereto, a first flange means extending substantially the length of said elongated hollow member and shaped to function at least in part as a portion of a vehicle door frame, a second flange means defining a portion of a windscreen seating flange, a depression in one of the flange means defining a first socket disposed on said elongated hollow member between said first and said second ends so as to be distinct therefrom and shaped to receive therein a roof header.

15. The integral structural element according to claim 14 further comprising a second socket disposed on said elongated hollow member and shaped to receive therein a B-post.

16. The integral structural element according to claim 14 wherein the first socket includes a flange portion that in combination with a shoulder portion defines parallel mounting surfaces shaped to cooperate with one end of a roof header member.

17. An integral structural element for use in a body-in-white comprising: an elongated hollow member with a first end and a second end opposite thereto, said member defining a first region, a second region, and a third region, a first flange means extending substantially the length of said elongated hollow member, a second flange means extending substantially the length of said elongated hollow member first region, a depression in said second flange means defining a first socket shaped to receive therein a roof header disposed on said elongated hollow member between said first region and said second region, and a second depression in said first flange means defining a second socket shaped to receive therein a B-post disposed on said elongated hollow member between said second region and said third region.

* * * * *

UNITED STATES PATENT AND TRADEMARK OFFICE
CERTIFICATE OF CORRECTION

PATENT NO. : 6,116,680
DATED : September 12, 2000
INVENTOR(S) : D.E. Hunter; R. Heiple; J.M. Shoup; D. Schnapp & K. Ruehle It is certified that error appears in the above-identified patent and that said Letters Patent is hereby corrected as shown below:

Patent Location           Correction

Col. 6, line 12     Before "first socket" insert --the--.

Col. 6, line 17     Delete "pocket" and insert therefor --socket--.

Signed and Sealed this

Twenty-ninth Day of May, 2001

Attest:

NICHOLAS P. GODICI

*Attesting Officer*     *Acting Director of the United States Patent and Trademark Office*